(12) United States Patent
Schroeder

(10) Patent No.: US 6,757,074 B2
(45) Date of Patent: Jun. 29, 2004

(54) COMPUTER AIR BRUSH

(75) Inventor: Daryl Schroeder, Florissant, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 10/108,542

(22) Filed: Mar. 28, 2002

(65) Prior Publication Data

US 2003/0184819 A1 Oct. 2, 2003

(51) Int. Cl.$^7$ .............................................. G06K 15/00
(52) U.S. Cl. ...................... 358/1.3; 358/1.15
(58) Field of Search ............................... 358/1.15, 1.3, 358/1.4, 1.12; 345/419, 679, 848, 856, 861, 600

(56) References Cited

U.S. PATENT DOCUMENTS

| | | | | |
|---|---|---|---|---|
| 5,767,843 A | * | 6/1998 | Wagner | ....................... 345/179 |
| 6,073,055 A | * | 6/2000 | Jahn | ............................ 700/97 |

FOREIGN PATENT DOCUMENTS

JP          62-217375     *   9/1987   ........... G06F/15/62

OTHER PUBLICATIONS

Clark, Zhang and Wallace; "Image acquisition using fixed and variable triangulation"; IEEE Xplore; Jul. 1995.*
Wikipedia.org; definition of triangulation.*
www.cage.rug.ac.be/~dc/alhtml/Delaunay; definition of Delaunay triangulation.*
Porretta, Nepa, Manara, Giannetti, Dohler, Allen and Aghvami; "User positioning technique for microcellular wireless networks" Electronics Letters May 1, 2003 vol. 39 No. 9; pp. 745–747.*
Xiang–Yang Li, Calinescu and Peng–Jun Wan; "Districuted Conostruction of a Planar Spanner and Routing for Ad Hoc Wireless Networks"; IEEE Infocom 2002; pp. 1268–1277.*

* cited by examiner

Primary Examiner—Jerome Grant, II

(57) ABSTRACT

A system is described for generating a digital image. A hand-held airbrush controller generates three-dimensional signal information and user trigger information. A plurality of receivers receives the three-dimensional signal information. A computer has a digital display and couples with the receivers to define a three-dimensional position of the controller. The computer is responsive to the user trigger information to generate the digital image on the display as a function of the user trigger information and the three-dimensional position. The airbrush controller includes a wireless transmitter that generates the three-dimensional signal information as signal burst information; the receivers include at least three wireless receivers for detecting the wireless signal burst information. The computer generates synchronization signals to initiate the signal burst information. Timing between the synchronization signals and receipt of the signal burst information, at the receivers, defines the three dimensional position. A bus may be used to communicate the synchronization signals from the computer to the airbrush controller. The airbrush controller includes one or more triggers (e.g., buttons) responsive to user hand control to generate the user trigger information.

16 Claims, 4 Drawing Sheets

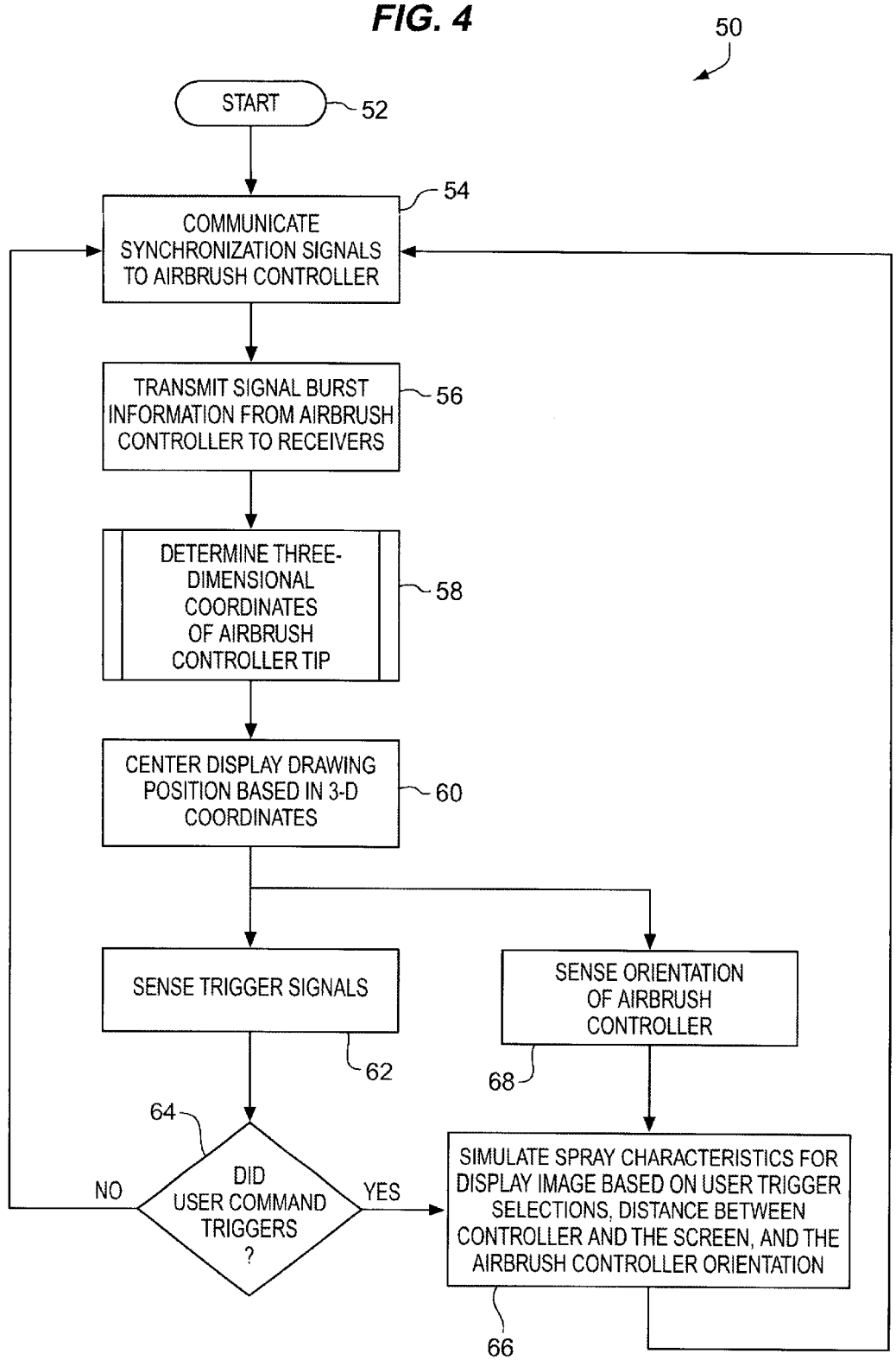

COMPUTER AIR BRUSH

BACKGROUND OF THE INVENTION

In the prior art, an airbrush connects to a paint supply so that a user may mix paint with air in a spray aimed at a target. The user may adjust the air-to-paint ratio in the spray in order to control the volume and density of paint reaching the target.

The prior art is also familiar with computer programs that operate with a computer and computer mouse to facilitate creation of artistic renditions. The user may for example move the mouse and make a drawing in various colors and shapes displayed on the computer's screen.

The invention provides techniques and methods for computerized and simulated airbrush painting. Other features of the invention will be apparent within the description that follows.

SUMMARY OF THE INVENTION

In one aspect, the invention provides a system for generating a digital image. A hand-held airbrush controller generates three-dimensional signal information and user trigger information. A plurality of receivers receives the three-dimensional signal information. A computer has a digital display and couples with the receivers to define a three-dimensional position of the controller. The computer is responsive to the user trigger information to generate the digital image on the display as a function of the user trigger information and the three-dimensional position.

In one aspect, the airbrush controller includes a wireless transmitter that generates the three-dimensional signal information as signal burst information; the receivers include at least three wireless receivers for detecting the wireless signal burst information.

In another aspect, the computer generates synchronization signals to initiate the signal burst information. Timing between the synchronization signals and receipt of the signal burst information, at the receivers, defines the three dimensional position. A bus may be used to communicate the synchronization signals from the computer to the airbrush controller. In one aspect, the bus may include a hose enclosing an electronic communication data path.

In still another aspect, the computer includes an image driver that coordinates and synchronizes the generation of the digital image.

In another aspect, the airbrush controller includes one or more triggers (e.g., buttons) responsive to user hand control to generate the user trigger information.

In yet another aspect, the three-dimensional position defines a distance to the display. The computer generates the digital image based, in part, on the distance.

In one aspect, the controller includes a second wireless transmitter to generate side-to-side signals. The receivers receive the side-to-side signals so that the computer may generate the image as a function of an orientation of the airbrush controller.

In one aspect, a method is provided for generating a computer image, including the steps of: automatically determining a three-dimensional position of a hand-held device; communicating the three-dimensional position, and user trigger selections at the device, to an image driver; and electronically generating the image on a digital display based upon the three dimensional position and user trigger selections.

The step of automatically determining may include the step of generating wireless signals captured by at least three receivers to triangulate on the device. The device may include an airbrush controller. The step of automatically determining may include automatically determining a three-dimensional position of an airbrush controller. The step of communicating may include communicating trigger information from the device to a computer over a data bus. The method may include the steps of communicating synchronization signals from the computer to the device over the bus and generating signal burst information at the device in response to receipt of the synchronization signals.

In another aspect, one method includes the steps of generating side-to-side wireless signals from the device and determining an orientation of the device. The orientation is used, in part, to generate characteristics of the image.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 4 shows a flowchart illustrating one method for controlling a computerized airbrush in accord with the invention.

DETAILED DESCRIPTION OF THE DRAWINGS

Figure 1:
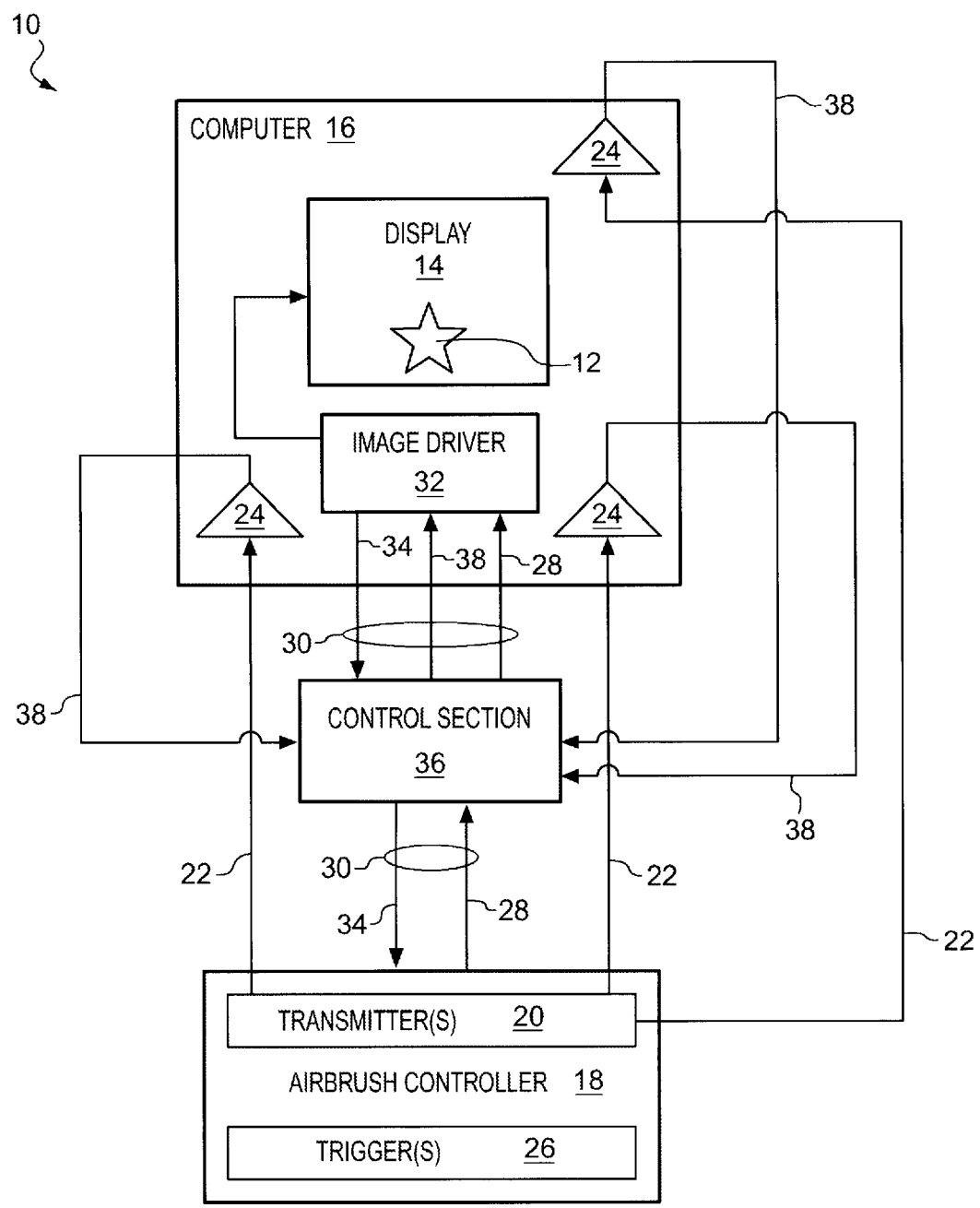
FIG. 1 shows one airbrush system of the invention.

FIG. 1 shows one airbrush system 10 of the invention. System 10 generates an image 12 on a display 14 of a computer 16 in response to user movement and control of a hand-held airbrush controller 18. One or more transmitters 20 with controller 18 communicate signal burst information 22 to a plurality of receivers 24 at computer 16 so that system 10 physically locates controller 18 in three-dimensions; receivers 24 may be attached to, or be integral within, computer 16 as a matter of design choice. A user may manipulate one or more finger triggers 26 (e.g., buttons, levers, knobs) of controller 18 to control and coordinate the creation of computerized image 12, over time. Trigger information 28 generated by user control of triggers 26 is communicated to computer 14 through a data bus 30 or other communication link.

Image driver 32 synchronizes the generation of image 12; driver 32 may for example include software and signal interfaces of computer 16 that are connected and configured to control system 10. Image driver 32 generates synchronization signals 34 for transmitters 20 to coordinate signal burst information 22. Signals 34 may be transmitted to controller 18 through data bus 30, as a matter of design choice. System 10 utilizes the timing between the generation of synchronization signals 34 and receipt of signal burst information 22 to define a three-dimensional location for controller 18.

Signals are optionally routed through a control section 36 to simplify cabling and connections between computer 16 and controller 18. Specifically, receivers 24 connect to section 36, as shown, and provide time-receive information 38 defining receipt of signal burst information 22 at respective receivers 24. Bus 30 may additionally connect through control section 36, as shown, to communicate information 28, 34 between computer 16 and controller 18.

In operation, driver 32 synthesizes information 28, 38 to define a three-dimensional location of controller 18, and to define user-adjustments to spray paint characteristics, via triggers 26, such that user movement and control of controller 18 "paints" image 12 substantially as if the user were manipulating a real airbrush relative to a painting surface. Triggers 26 are for example used to define the spray paint characteristics of image 12; at the same time, the three-dimensional movement of controller 18 defines spatial properties of image 12.

Signal burst information 22 may take the form of wireless signals, in accord with one embodiment of system 10. Accordingly, transmitters 20 may for example include wireless (e.g., radio-frequency, infra-red) transmitters and receivers 24 may for example include corresponding wireless receivers. However, signal burst information 22 may communicate to receivers 24 by a physical data bus connection as a matter of design choice.

Time-receive information 38 may also take the form of wireless signals, in accord with one embodiment of system 10. Accordingly, receivers 24 may for example include wireless transmitters to generate wireless information 38 and control section 36 may for example include a corresponding wireless receiver. However, time-receive information 38 may communicate to control section 36 by a physical data bus connection as a matter of design choice. By way of example, time-receive information 38 also preferably couples to computer 16 via bus 30, as shown. Those skilled in the art should appreciate that data connections by and through section 36 may be eliminated by and through direct bus connections and/or wireless communications between controller 18 and computer 16 for each of data paths 28, 34 and 38.

Figure 2:
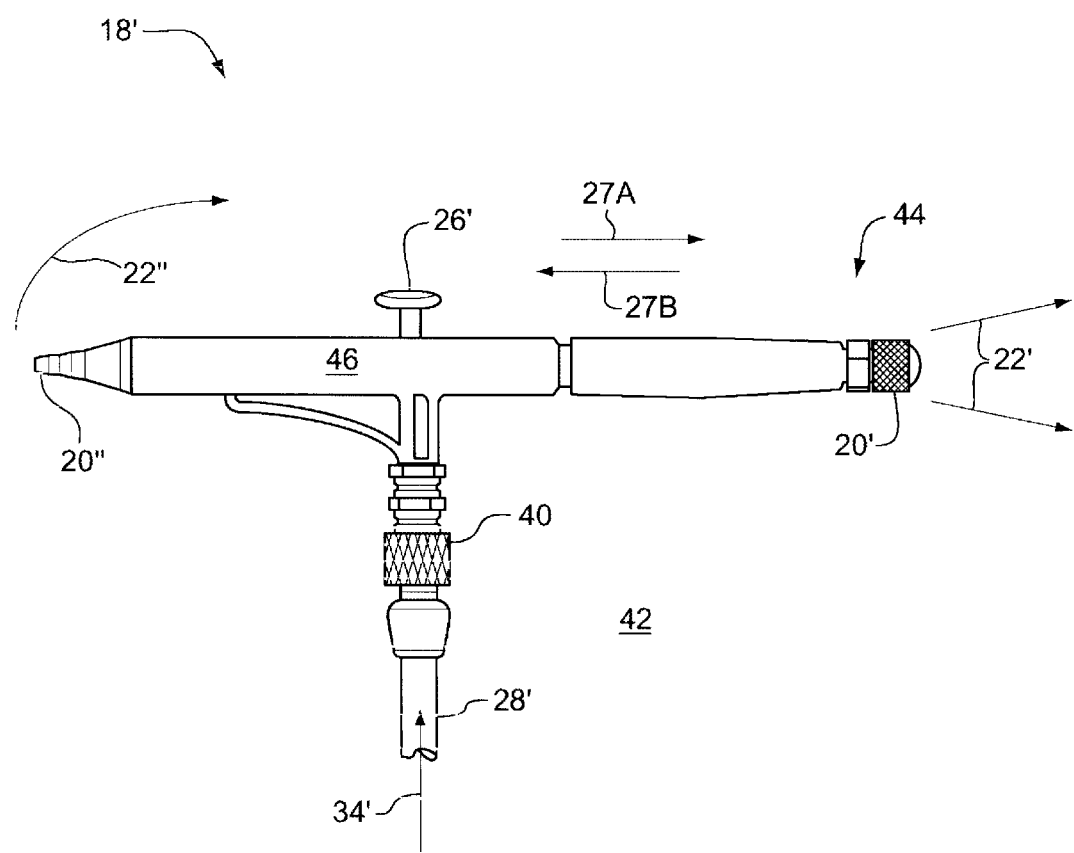
FIG. 2 shows a side view of one airbrush controller suitable for use in the airbrush system of FIG. 1.

FIG. 2 shows one airbrush controller 18' suitable for use with the invention. Controller 18' is a hand-held device preferably shaped similarly to a standard airbrush, so as to invoke familiarity in artists using controller 18'. In operation, a user grips a handle 40 to manipulate controller 18' in free space 42. A transmitter 20' at the tip 44 of controller 18' generates wireless signals 22' to communicate signal burst information to the host computer, e.g., computer 16, FIG. 1. The user may manipulate spray characteristics in the image generated at the host computer by a dual action trigger button 26'. Button 26' for example controls the volume and density of the "paint" applied to image 12, FIG. 1: moving button 26' forward along direction 27A changes the perceived air-to-paint ratio as having more air; moving button 26' backward along direction 27B, on the other hand, increases the perceived ratio of "paint".

Airbrush controller 18' communicates trigger information to the host computer by a bus connection 28'; connection 28' may even form the outer appearance of a standard paint hose as a matter of design choice. As described in FIG. 1, bus connection 28' may connect directly to control section 36 which in turn has a bus connection 30 to computer 16. Bus connection 28' further supplies synchronization signals 34' to controller 18', illustratively communicated within connection 28' as shown. Signals 34' are for example used to trigger generation of signals 22' from transmitter 20' so as to determine three-dimensional location of tip 44 relative to display 14'.

Figure 3:
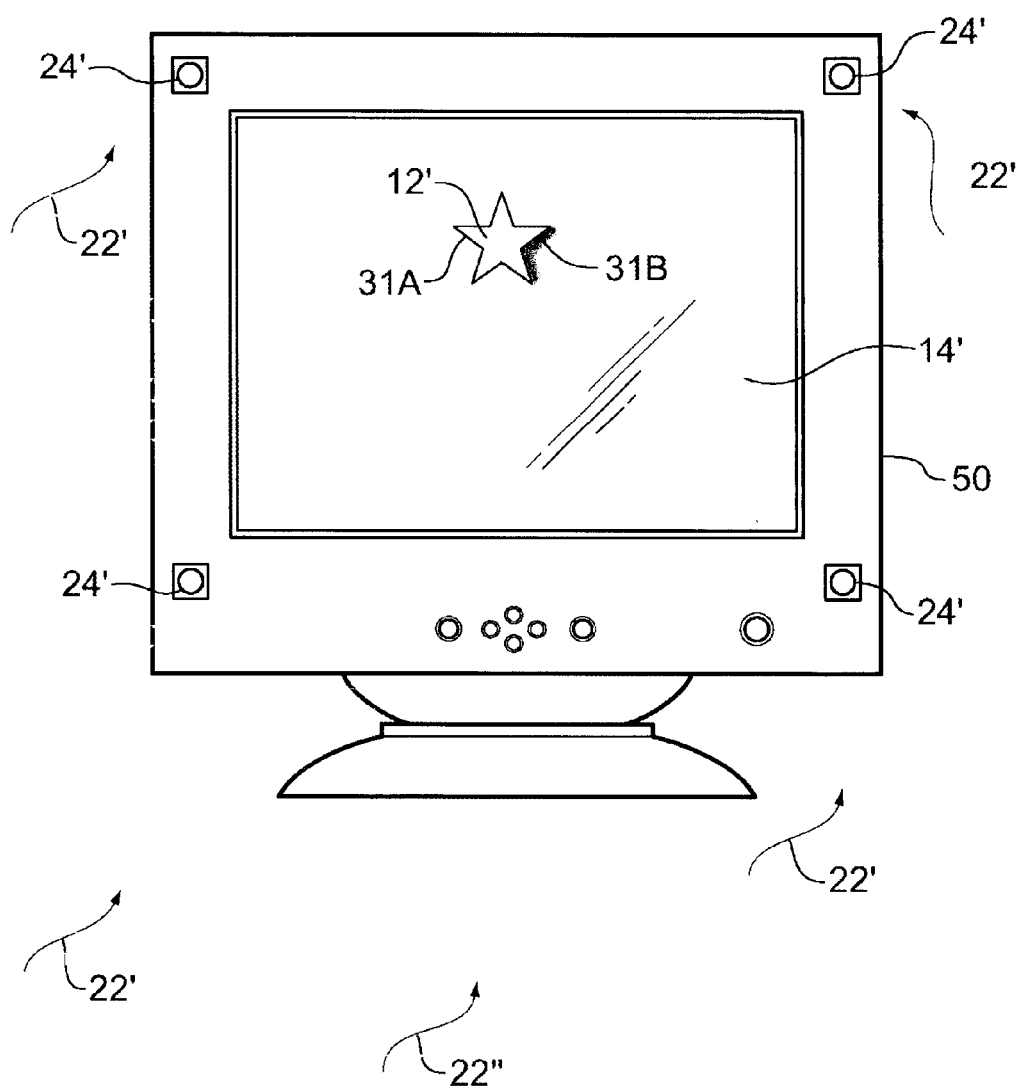
FIG. 3 shows a front view of one computer display suitable for use in the airbrush system of FIG. 1.

In one illustrative operation, transmitter 20' at tip 44 is used to broadcast signal bursts 22' for reception by receivers 24' attached to a computer display monitor 50, shown in FIG. 3. Receivers 24' capture signals 22' so as to three-dimensionally locate the absolute position of tip 44 to within about ±0.05 inch. System 10 of FIG. 1 may for example generate a three-dimensional coordinate grid corresponding to movement of tip 44 due to user interaction with controller 18'. The accuracy to which tip 44 is located provides the user with fine control over painting effects within her computer generated image 12, similar to how she would have control over a standard airbrush making a painting on a painting surface. When the user adjusts button 26', he may further fine adjust spray characteristics 31 within image 12'. By way of example, spray characteristic 31A differs from spray characteristic 31B in image 12'. Characteristics 31A, 31B illustrate two separate settings of button 26'. Those skilled in the art should appreciate that many different spray characteristics may be obtained through adjustment of button 26' and/or other triggers 26 as a matter of design choice.

Optionally, airbrush controller 18' includes a second transmitter 20" to transmit side-to-side signals 22" to the receivers (e.g., receivers 24) at the host computer. System 10 may utilize side-to-side signals 22" with other location signals 22' to determine, as appropriate, which side of airbrush controller 18' is partially facing the host computer. FIG. 2 shows only one side 46 of controller 18'. System 10 may adjust spray and other image generation characteristics depending upon which side of airbrush controller 18' is partially facing the host computer; preferably such adjustment simulates how tilting a standard airbrush would modify paint characteristics in painting on a painting surface, while in fact generating image 12'.

FIG. 3 shows a computer monitor 50 suitable for use with the invention. In particular, monitor 50 may provide computer display 14'. Display 14' may for example display image 12' as generated by airbrush controller 18', FIG. 2. Monitor 50 also illustrates one acceptable configuration for receivers 24', used for example to capture wireless signals 22', 22" of FIG. 2. Receivers 24' may also function with the features of receivers 24, FIG. 1, to facilitate generation of image 12'. Three receivers 24' may be used in defining the three dimensional position of tip 44. FIG. 3 however shows four receivers 24' used for redundancy to improve communication between controller 18' and the host computer.

The host computer operating with monitor 50 may for example be computer 16 of FIG. 1. Software with image driver 32 uses the location and button information from controller 18, 18' to simulate painting on display 14' as if the user manipulated a standard airbrush. The invention thus has several advantages such as by providing an input device—e.g., in the form of an airbrush controller 18'—that allows high free-form flexibility for an artist to create and/or touch-up digital artworks with a computer.

FIG. 4 shows a flowchart 50 illustrating one method of the invention suitable for use with an airbrush controller 18, 18'. Flowchart 50 starts at step 52. At step 54, synchronization signals are communicated to the airbrush controller. At step 56, the airbrush controller transmits signal burst information to the receivers. At step 58, a three-dimensional position of the controller tip is determined. At step 60, the spatial location on the computer screen is set based on the three-dimensional position. Trigger signals are sensed at step 62, defining user selections at the airbrush controller. At decision branch 64, painting of the image commences at step 66 so long as the user has made a trigger command; otherwise, processing continues at step 54, as shown. Optionally, at step 68, the orientation of the airbrush is determined, such as with the second transmitter 20", FIG. 2. At step 66, the displayed image is generated based upon (a) user trigger selections and (b) the distance between the controller and the display and/or the orientation of the airbrush controller. The distance is defined by the three-dimensional position and affect the simulated spray characteristics: the spray will for example diverge the farther the tip is from the computer screen.

Those skilled in the art should appreciate that steps 52–68 are illustrative and not limiting. Steps 52–68 may be reordered, augmented or modified without departing from the scope of the invention, such as in accordance with the attached claims. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A system for generating digital image, comprising:
   a hand-held airbrush controller for generating three-dimensional signal information and user trigger information, the airbrush controller having a wireless transmitter to generate the three-dimensional signal information as signal burst information;
   a plurality of receivers for receiving the three-dimensional signal information, the receivers having at least three wireless receivers for detecting the wireless signal burst information; and
   a computer having a digital display, the computer coupled with the receivers to define a three-dimensional position of the controller and operative to generate the digital image on the display as a function of the user trigger information and the three-dimensional position.

2. A system of claim 1, the computer generating synchronization signals initiating the signal burst information, wherein timing between the synchronization signals and receipt of the signal burst information, at the receivers, defines the three dimensional position.

3. A system of claim 2, further comprising a bus for coupling the synchronization signals from the computer to the airbrush controller.

4. A system of claim 3, the bus comprising a hose including an electronic communication data path.

5. A system of claim 1, further comprising a control section for coupling the airbrush controller to the computer.

6. A system of claim 1, the computer having an image driver for synchronizing the generation of digital image.

7. A system of claim 1, the airbrush controller comprising one or more triggers responsive to user hand control to generate the user trigger information.

8. A system of claim 1, further comprising a control section for coupling between the receivers and the computer.

9. A system of claim 1, further comprising a bus coupling data from the receivers to the computer.

10. A system of claim 1, the three-dimensional position defining a distance to the display, the computer generating the digital image based, in part, on the distance.

11. A system of claim 1, the airbrush controller further comprising a second wireless transmitter for generating side-to-side signals, the receivers receiving the side-to-side signals wherein the computer generates the image as a function of an orientation of the airbrush controller.

12. A method for generating a computer image, comprising the steps of:
    automatically determining a three-dimensional position of a hand-held device by generating wireless signals captured by at least three receivers to triangulate on the device; communicating the three-dimensional position, and user trigger selections at the device, to an image driver; and electronically generating the image on a digital display based upon the three dimensional position and user trigger selections.

13. A method of claim 12, the step of automatically determining comprising automatically determining a three-dimensional position of an airbrush controller.

14. A method of claim 12, the step of communicating comprising communicating trigger information from the device to a computer over a data bus.

15. A method of claim 14, further comprising the steps of communicating synchronization signals from the computer to the device over the bus and generating signal burst information at the device in response to receipt of the synchronization signals.

16. A method of claim 12, further comprising generating side-to-side wireless signals from the device and determining an orientation of the device, the step of electronically generating comprising generating the image based, in part, on the orientation.

* * * * *